United States Patent [19]

Heckle

[11] 3,824,855

[45] July 23, 1974

[54] METHOD AND APPARATUS FOR MEASURING THE FLOW RATE OF FLUIDS SUCH AS GASES OR LIQUIDS

[76] Inventor: Manfred Heckle, Max-Wolf Str. 16, D-69 Heidelberg, Germany

[22] Filed: Jan. 14, 1972

[21] Appl. No.: 217,754

[30] Foreign Application Priority Data
Jan. 25, 1971 Germany............................ 2103248
Mar. 11, 1971 Germany............................ 2111627
July 15, 1971 Germany............................ 2135310

[52] U.S. Cl............................................. 73/194 B
[51] Int. Cl............................ G01f 1/00, G01p 5/10
[58] Field of Search............................ 73/194, 228

[56] References Cited
UNITED STATES PATENTS
2,111,036  3/1938  Wippel.................................... 60/1
2,453,376  11/1948  Lagasse.................................. 73/194
2,809,520  10/1957  Richard, Jr............................. 73/194

Primary Examiner—Herbert Goldstein
Attorney, Agent, or Firm—Craig & Antonelli

[57] ABSTRACT

This invention relates to a method and apparatus for measuring the flow rates of liquids or gases. The method essentially comprises the steps of directing the fluid past an element which can oscillate transversely of the fluid flow, said element being normally biassed into the fluid flow, and measuring the oscillation frequency of said element to give the flow rate of the fluid. One form of apparatus for use in carrying out the method of the invention comprises a chamber through which the fluid can flow, a duct leading into said chamber for introducing the fluid into the chamber, an oscillatory element having at least a portion disposed in said chamber and being movable by the fluid flow transversely thereof about an axis offset with respect to the fluid flow. The fluid flow can be split into two or more separate flow paths. If this is done the apparatus comprises a collecting chamber through which the fluid can flow, a fluid inflow chamber to divide the fluid flow into at least two separate flow paths, conduits leading from said inflow chamber to said collecting chamber, each of said conduits having an outlet aperture in said collecting chamber, an oscillatory element mounted in said collecting chamber for movement transversely with respect to the fluid flow paths, and said element having portions which are acted on by the flow paths to cause the element to oscillate.

29 Claims, 23 Drawing Figures

XII

Fig. 12

METHOD AND APPARATUS FOR MEASURING THE FLOW RATE OF FLUIDS SUCH AS GASES OR LIQUIDS

This invention relates to a method and apparatus for measuring the flow rate of fluids such as gases or liquids.

Known flow rate measuring methods can be divided into methods which supply the instantaneous volume flow or mass flow in m³/s or kg/s respectively as an analog measurement value, and those which give the quantity flowing through in a specific unit of time as a digital measurement value. The last-mentioned method of volume or quantity measurement is necessary when the effective gas or liquid consumption has to be ascertained, either in order to determine the amount of water or gas used in domestic establishments, for measuring consumption in industry, or for quantity-dependent or volume-dependent control and regulation of processes in processing work and in dealing with energy supplies. Digitally operating flow rate measuring methods, however, are also preferred in processing since digital signals are desirable when using process computers. Whereas with the first-mentioned methods it is first of all necessary to carry out analog-digital conversion, this can be dispensed with if the measuring method directly produces a digital signal.

Digital measuring apparatus include, for example, rotary-piston gas meters, wet and dry gas meters, turbine-type meters and screw gas meters, which operate substantially by mechanical methods. These meters are either of complicated mechanical construction, more particularly regarding the mounting of the rotor, or operate in a very inaccurate manner when dealing with small flow quantities. With other known digital measuring methods, sensitive measuring sensors are necessary in order to convert the pressure or velocity signals emanating from the Karman vortices or the vortex precession of a helical flow system into electrical signals. The apparatus used in these cases are also suitable only for limited measurement ranges.

It is an object of the invention to provide a method and apparatus for measuring the flow rate of fluids which overcomes or substantially reduces some or all of the disadvantages discussed above.

According to the invention there is provided a method of measuring the flow rate of a fluid comprising the steps of directing the fluid past a mechanical oscillatory element mounted to be movable transversely to and laterally to said fluid flow, and which is under the influence of a force urging it into the flow, the measuring the oscillation frequency of the oscillatory element.

Practical tests have shown that after the oscillatory element enters the fluid flow, it carries out a uniform oscillatory movement of a frequency which is proportional to the mass flow. This oscillatory movement is produced by the flow forces which act on the element and which are opposed by a deliberate force in such a manner that the oscillatory element oscillates about a central position. The said deliberate force can be the gravitational force of the oscillatory element, a spring force or the like. In a preferred embodiment, the force urging the oscillatory element into the flow is, however, produced in another way. For this purpose the fluid is sub-divided into at least two separate flow paths which are directed past the oscillatory element which is mounted between them, the flow paths being united after passing the oscillatory element. The said element oscillates about a central position, entering each of the two flow paths alternately. The force displacing the oscillatory element into one of the two flow paths is formed by those flow forces of the other flow path which act on it, in conjunction with the inertia of the element. When the oscillatory elements enters one flow path, after reaching a certain depth of penetration it is thrown back and moves into the other flow path because of its inertia. This alternation finally results in a uniform oscillatory movement within a short space of time.

Practical tests have shown that the oscillation frequency achieved in this way is linearly proportional to the flow rate. This is deomonstrated by the following theoretical study:

The flow forces acting on the oscillatory element are impulse forces which are proportional to the value $m^2/\rho$, $m$ being the mass flow in kg/s and $\rho$ the density of the fluid. These forces increase in proportion as the oscillatory element moves further out of its central position or the more deeply it penetrates into one of the two flow paths. Therefore, they can be compared to the force of a mechanical spring whose spring rate $c$ is proportional to the value $m^2/\rho$. Since the natural frequency $f_e$ of an undamped spring-mass rotary oscillator is proportional to $\sqrt{c/I}$, the natural frequency can be expressed as follows:

$$f_e \sim \sqrt{c/I} \sim \sqrt{m^2/\rho I} = m \sqrt{1/\rho I},$$

Thus the flow rate is linearly dependent on the frequency of the oscillatory element and inversely proportional to the root of the density of the fluid and the moment of inertia $I$ of the oscillatory element. Thus with a constant density of fluid, which is usually the case, the frequency of the oscillatory element is linearly dependent exclusively on the mass flow. The frictional losses which have to be replaced for maintaining the oscillatory movement are taken as energy from the flow.

The linear dependence between frequency and mass flow and also the small number of possible factors show the simplicity of the method proposed by the present invention.

In the case where two flow paths are used, the initiation of the oscillatory movement from the middle position of the oscillatory element, in which it is aligned symmetrically with respect to the direction of flow, is effected by turbulence which form in the region of the oscillatory element. Advantageously, the two flow paths are so taken past the oscillatory element that they just fail to contact the oscillatory element when it is situated in the middle position.

According to a further aspect of the invention, there is provided apparatus for measuring the flow rate of a fluid comprising a duct for directing the fluid past a laterally offset oscillatory element, at least a portion of said oscillatory element being housed in a chamber which is influenced by the flow. In a convenient constructional example the duct is arranged horizontally and the oscillatory element is mounted above the fluid flow so that it only enters the flow under the action of gravitational force as a restoring force.

If the fluid flow is to be separated into two flow paths, the apparatus can include an inlet chamber to divide the fluid flow into at least two flow paths which are fed through conduits to outlet apertures which open into a collecting chamber, the oscillatory element being arranged in the collecting chamber so that said portion thereof, in use, is influenced by the fluid flow.

It will be appreciated that these apparatus are of very simple construction as they do not have any rotatable parts which need accurate bearing arrangements, nor do they require sensitive measuring sensors. Accordingly it is possible to obtain an excellent standard of precision in measurement with a low constructional outlay. As compared with mechanically operating digital apparatus, the apparatus of the invention covers relatively large measurement ranges with better precision, whereas more particularly the substantially lower expense is a notable factor relatively to the vortex measuring method.

Advantageously, in the case of a split flow path, at least that portion of the oscillatory element which is influenced by the fluid flow is constructed symmetrically with respect to the direction of flow. Preferably the portion of the oscillatory element influenced by the fluid flow also includes detachment edges. When two fluid flow paths are used, the detachment edges, when the oscillatory element is in the central position, are approximately aligned with the internal mutually facing boundary walls of the outlet apertures, so that the flow just fails to contact the detachment edges.

The mounting of the oscillatory element can be situated upstream — in relation to the direction of flow — of the outlet apertures, or in other words substantially in the flow "shadow." The oscillatory element can be mounted with play on a shaft at right angles to the direction of flow. According to another constructional example, the oscillatory element is held by suspension means which are elastic transversely to the direction of fluid flow. In these two constructional examples the simple constructional layout will also be apparent, since substantially no manufacturing tolerances have to be observed.

In a particularly simple arrangement, the oscillatory element is prismatic or polygonal in shape and is mounted in the region of one edge of the prismatic outline whereas one of the other or the two other edges form the detachment edges. Alternatively, the oscillatory element may be of a different shape, e.g., cylindrical, and may be eccentrically mounted. Here again it will be noted how simple the construction is requiring only very simple manufacturing techniques. Experiments have shown that basically different oscillatory element forms can be combined with different duct cross-sections.

Whereas an oscillatory element of comparatively inconsiderable mass is suitable for gases, in the case of liquids, more particularly viscous substances, it is advantageous to give the oscillatory element a relatively considerable mass. Thus in the one case the oscillatory element can be more or less hollow and in the other case can be constructed as a solid body.

In order to permit the apparatus to operate independently of preferred positions with an oscillatory element of considerable mass also, the oscillatory element is mounted approximately at its centre of gravity.

To excite oscillations, more particularly in the case of separated fluid flow paths, various measures can be adopted. For example an asymmetrical outflow or an outflow angled relatively to the inflow direction may be provided. Finally, turbulence-producing means can be arranged downstream of the oscillatory element. These measures may of course also be combined with one another. Once the oscillatory element has been stimulated, it maintains the oscillation frequency proportional to the throughflow.

In order to keep the influences of the apparatus housing on the oscillatory movement of the oscillatory element as small as possible, the said element is arranged with spacing on all sides from the chamber walls, so that the shearing forces between the oscillating oscillatory element and the fluid flowing between it and the neighbouring chamber wall do not reach any considerable value.

The apparatus in a particularly convenient embodiment the inflow chamber and the collecting chamber are formed in a common housing having an inlet and outlet union for connection to a piping system. The apparatus can thus be fitted without difficulty in any desired piping system, since the unions can be dimensioned in accordance with the relevant standards.

The frequency of the oscillatory element can be measured inductively or photo-electrically as is known per se, and conventional take-off and reading devices and circuits can be provided.

To measure the frequency, a flow phenomenon occurring in the case of the apparatus of the invention can also be used. The detachment edge of the oscillatory element which enters the flow path produces in this flow region a short-term pressure increase which can be recorded by a conventional responsive pressure pick-up so that the succession of pressure impulses supplies the actual measurement value.

Owing to the inertia effect of the flowing fluid, this pressure increase arising as a result of a damming effect is subject to a time lag relatively to the movement of the oscillatory element, i.e., the counter-force exerted by the flow on the oscillatory element is smaller on entering the part-flow than when the oscillatory element issues. If this pressure increase is integrated over one oscillation period, there is obtained the value transmitted to the oscillatory element during the period.

In the case of gases and liquids, this energy is generally sufficient to overcome the frictional losses which occur owing to the viscosity of the fluid and result in damping of the oscillatory movement. With very slow-flowing mass flows or in the case of fluids of considerable viscosity, it must be expected that the aforesaid effect will not be sufficient to compensate for the frictional losses. In order to obtain satisfactory operation and linear dependence of frequency on throughflow for these extreme cases also, the oscillatory element can be subjected to external force proportional to its momentary velocity. In this way a damping-inhibiting effect is obtained which is effective from the outside, a velocity-proportional signal $\dot{x}$ being taken from the oscillatory element and passed as a force $F = k.\dot{x}$ to the oscillatory element. In this way it is guaranteed that the oscillatory element permits an equally advantageous measuring method even with viscous and slow-flowing fluids.

In a preferred construction, a travel-dependent signal is taken from the oscillatory element, is electrically differentiated and made to act as a force proportional thereto on the oscillatory element.

In another embodiment, a velocity-proportional signal is taken direct from the oscillatory element and applied as a force proportional thereto to the oscillatory element.

An electrical feedback can convert the velocity-proportional signal into a force acting on the oscillatory element. Since such electrical feedbacks are known, they will not be described.

The force to be applied to the oscillatory element can be produced, for example, by arranging a magnet on the oscillatory element which is under the action of an external magnetic field varying in proportion to velocity.

Several embodiments of apparatus of the invention will now be described, by way of example only, with reference to the accompanying diagrammatic drawings, in which:

FIGS. 4(A-H) show various constructional examples of oscillatory elements in longitudinal section and plan view;

FIGS. 6 (A and B) show detail views of the mounting arrangement shown in FIG. 5;

FIGS. 9(A-D) show various positions illustrating the oscillatory process;

Figure 1:
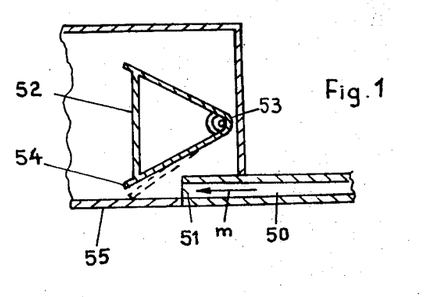
FIG. 1 shows a diagrammatic view of a very simple constructional example, in section.

In FIG. 1 the mass flow $m$ of the fluid is indicated with an arrow. The fluid is conducted in a duct 50 downstream of whose outlet aperture 51 and laterally offset relatively to the flow — in the illustrated constructional example above the said flow — the mechanical oscillatory element 52 is pivotally mounted at 53. The oscillatory element 52 in this case is constructed as an equilateral prism having an edge 54 in the fluid flow. When there is no fluid flow through the apparatus, the oscillatory element is situated with its detachment edge 54 against the lower chamber wall 55. As soon as the fluid flows into the duct 50, it lifts the oscillatory element 52 which, under the action of its own inertia, is lifted out of the flow path but then enters it again owing to its gravitation force. In a short time, this results in a uniform oscillatory movement which is proportional to the mass flow and takes place about a force-free central position, as will be described in detail hereinafter.

Figure 2:
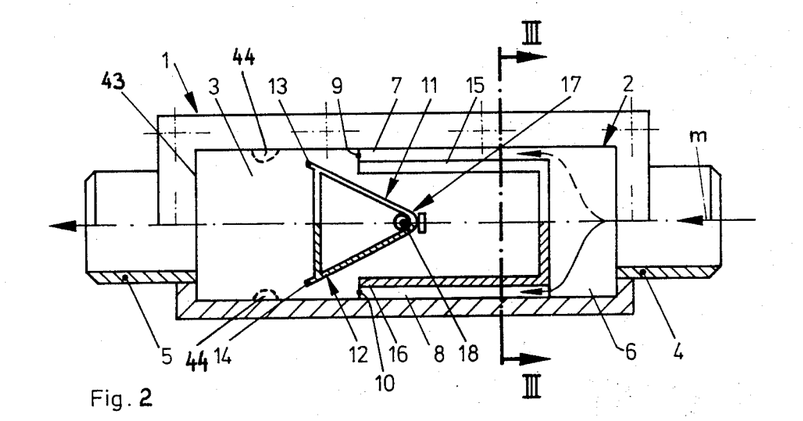
FIG. 2 shows a longitudinal section through another constructional form of the apparatus.

The flow rate measuring apparatus shown in FIG. 2 has a housing 1 which comprises an inflow chamber 2 and a collecting chamber 3. The inflow chamber 2 is provided with an inlet union 4, and the collecting chamber 3 with an outlet union 5, by means of which the apparatus can be fitted in a system of piping not shown here. In the illustrated constructional example the mass flow $m$ is divided into two flow paths. For this purpose, the inflow chamber 2 comprises an antechamber 6 from which the fluid flows out through two ducts 7, 8. The ducts 7, 8 like the housing 1 and the two chambers 2, 3 are of rectangular form, but they may also be of other cross-sectional forms. The ducts 7, 8 open at their outlet apertures 9, 10 into the collecting chamber 3 in which the two flow paths are united again.

Between the two ducts 7, 8 or the flow paths from them, there is arranged an oscillatory element 11 having a portion 12 which is acted on by the flow paths, the element 11 being arranged downstream of the outlet apertures 9, 10 of the ducts 7, 8, when considered in the direction of the fluid flow. The oscillatory element 11 is prismatic in shape, having rear edges 13, 14 forming detachment edges which are disposed parallel to the flow paths. The oscillatory element 11 is so constructed that when it is in the central position (see FIG. 2) in which it is aligned symmetrically with respect to the longitudinal axis of the apparatus, the edges 13, 14 are flush with the inner boundary walls 15, 16 of the ducts 7, 8 so that they do not enter the flow path in this position.

The oscillatory element 11 is mounted so that it can oscillate transversely to the direction of flow (i.e., in the drawing plane in FIG. 2), for example by pivoting about a shaft 18 arranged in the region of its third prismatic-body edge 17.

Figure 3:
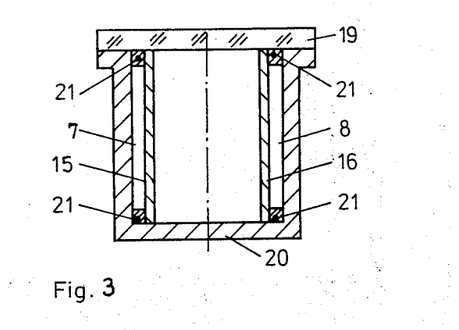
FIG. 3 is a section on III—III of FIG. 2.

The oscillatory element 11 is arranged with all-around spacing from the housing walls, more particularly including spacing from the upper and lower walls 19, 20 shown in FIG. 3. In order to obtain unequivocal flow conditions, the flow paths are also conducted with spacing from these walls, for which reason the ducts 7, 8 are bounded above and below by strips 21. The lower or upper wall 19 of the housing can be formed, as FIG. 3 shows, with a detachable inspection window, so that the apparatus can be inspected at any time and any impurities carried along by the fluid and deposited in the measuring apparatus can be removed without difficulty. The inlet and outlet unions 4, 5 provided for fitting the apparatus in a piping system correspond to the relevant standards. The apparatus itself can be fitted substantially in any desired manner but is preferably arranged in a horizontal or vertical position, in the latter case the fluid flow passing downwardly through the apparatus from above.

FIGS. 4(A-H) show several alternative forms of the prismatic oscillatory element 11. In FIGS. 4A and 4B the oscillatory element 22 comprise an angle plate 26 with limbs of equal length, whose open side is stiffened by a web plate 27. In the region of the junction edge 28 there is arranged a sleeve 29 for mounting the oscillatory element 22 on a shaft not shown here. The oscillatory element 23 of FIGS. 4C and 4D, in contrast, consists of a straight prism of solid material in the region of whose edge formed of two non-parallel surfaces there is arranged a bore 30 which is used for mounting purposes and extends at right angles to the parallel surfaces 31 of the oscillatory element 23.

Figure 4A:
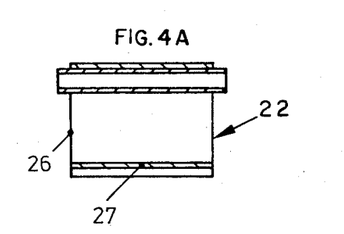
Figure 4B:
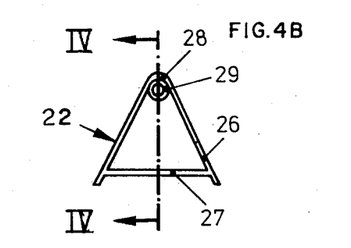
Figure 4C:
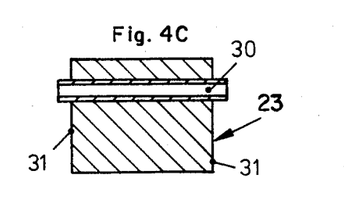
Figure 4D:
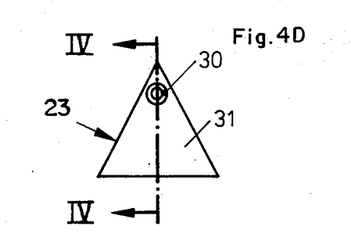
Figure 4E:
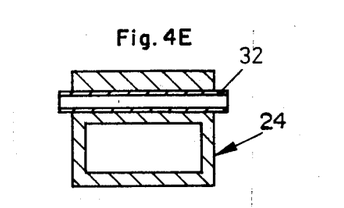
Figure 4F:
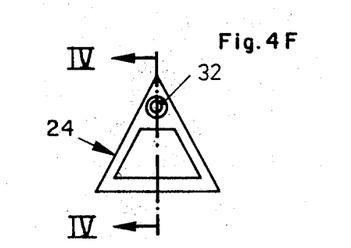
Figure 4G:
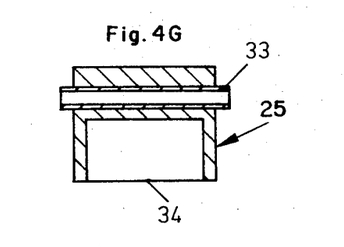
Figure 4H:
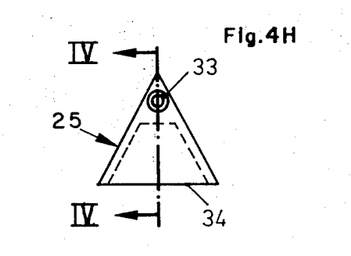

The oscillatory element 24 shown in FIGS. 4E and 4F consists of a prismatic hollow element which is closed on all sides and again comprises a bearing sleeve 32, but the oscillatory element 25 shown in FIGS. 4G and 4H is open in the outflow direction — opposite the bearing sleeve 33 — as indicated at 34. The oscillatory element may also be of any other shape such as cylindrical with appropriately arranged detachment edges. In every case it has been found expedient to make the mass of the oscillatory element larger in proportion as the viscosity of the fluid is greater.

Figure 5:
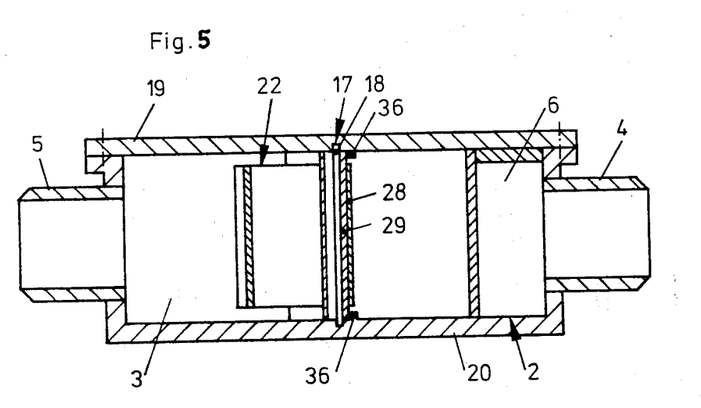
FIG. 5 shows a longitudinal section through the apparatus with one constructional form of the mounting for the oscillatory element, turned through 90° relatively to FIG. 2.
Figure 6A:
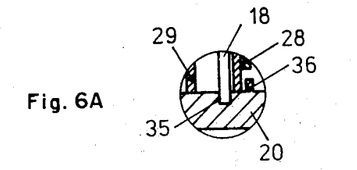
Figure 6B:
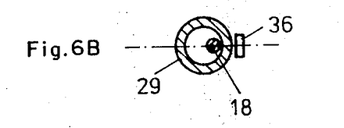

In FIGS. 5 and 6A and 6B there is shown a mounting arrangement for the oscillatory element 17 of FIG. 2. This oscillatory element corresponds generally to the oscillatory element 22 shown in FIGS. 4A and 4B. As already shown there, the oscillatory element includes a sleeve 29 in the region of the junction edge 28. By means of this sleeve, the oscillatory element is mounted on a shaft 18, the sleeve freely surrounds the shaft since the oscillatory element is in any case pressed against the shaft 18 by the fluid flow pressure. This guarantees that the sleeve 29 can roll on the shaft 18 and does not slide during oscillatory movement. The shaft 18 itself is secured in the housing 1 at its two ends 35 which engage in bores provided in the upper and lower housing walls 19, 20 one end of which is shown in FIG. 6A. To retain the oscillatory element oppositely to the fluid flow direction, stops 36, such as shown in FIG. 6B, are arranged at the upper and lower housing walls 19, 20. The length of the sleeve 29 is so dimensioned that its abutment on one or both housing walls 19, 20 retains the oscillatory element 22 axially.

Figure 7:
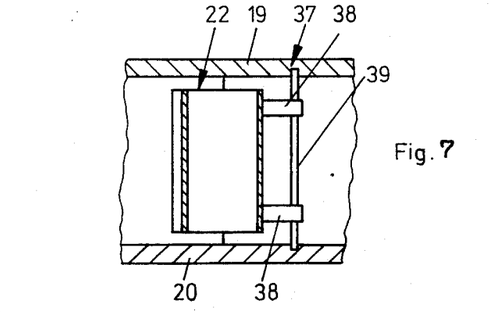
FIG. 7 shows a fragmentary sectional view similar to FIG. 5 with another constructional form of the mounting arrangement for the oscillatory element.
Figure 8:
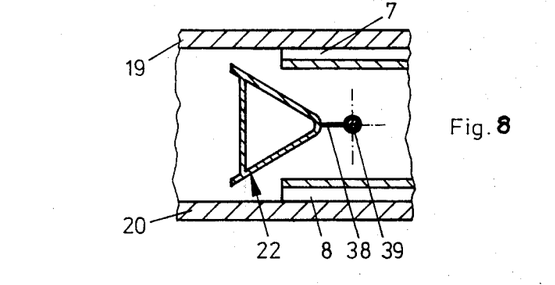
FIG. 8 shows a sectional view turned through 90° relatively to FIG. 7.

The mounting arrangement shown in FIG. 7 and FIG. 8 comprises a suspension system 37 which is elastic transversely to the direction of flow, that is to say in the direction of oscillation, but is rigid at right angles thereto. For this purpose, thin metal strips 38 can be used which are looped at one end about a pin 39 secured in the housing and to which the oscillatory element 22 is secured at the other end. To obtain the necessary rigidity in one direction (in the drawing plane in FIG. 7) at least two such metal strips 38 are arranged one above the other.

From the foregoing description of some constructional forms of oscillatory element and the mounting arrangements for the said element, a large number of possible modifications will be apparent. The mounting arrangements described (FIGS. 5 to 8) have the important advantage that even impurities such as sand particles which might be present in fresh water or the like, do not impair the mounting arrangement and therefore the operational reliability of the apparatus is good. But if this should happen, such impurities can easily be removed since all parts of the apparatus are easily accessable.

FIGS. 9(A–D) shown the oscillation process of the FIG. 2 embodiment in several phases. In the positions of FIG. 9A the oscillatory element 11 is situated in its central position. Since the spacing of the two edges 13, 14 corresponds to the spacing of the internal boundary wall 15, 16 of the two ducts 7, 8, the oscillatory element 11 is just out of contact with the two flow paths $m_r$ and $m_1$. Stimulated by turbulences created in the region of the oscillatory element 11, the said element is first of all deflected in a direction, for example upwards as indicated by the arrow 40 in FIG. 8. Owing to inertia, the oscillatory element moves further into the flow path $m_r$, which is equal in magnitude to the flow path $m_1$ and forms together therewith the total mass flow $m$, whereas the flow path $m_1$ flows past the oscillatory element without influencing the latter. The further the detachment edge 13 enters the flow path $m_r$, the stronger the reaction force effected by the flow becomes, so that the oscillatory element 11 is checked until it comes to a standstill in position as shown in FIG. 9B. Since the flow path $m_r$ is partially blocked by the detachment edge 13, a small proportion $m_{r2}$ flows in an almost opposite direction along the oscillatory element 11 whereas the greater proportion $m_{r1}$ flows further in the same direction. At the same time, a slight pressure increase occurs in the flow region 42 directly in front of the detachment edge 13.

Figure 9A:
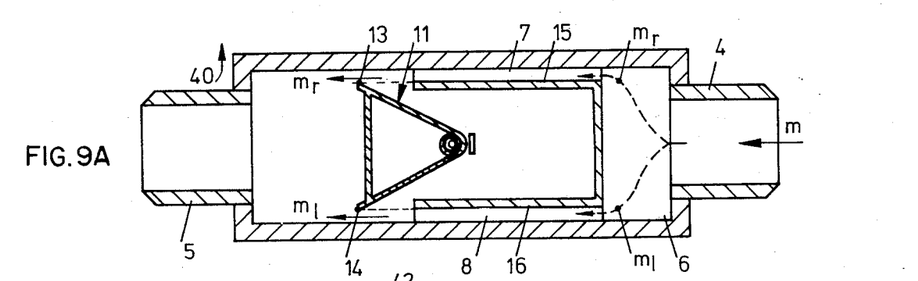
Figure 9B:
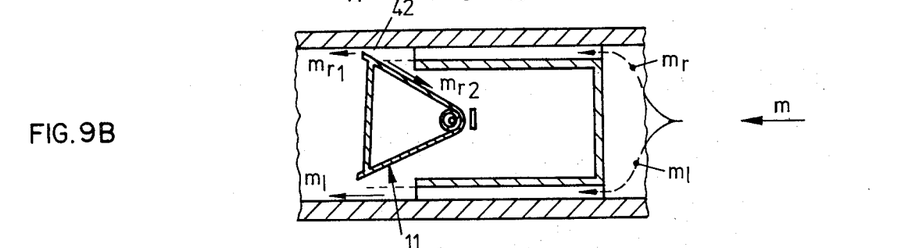
Figure 9C:
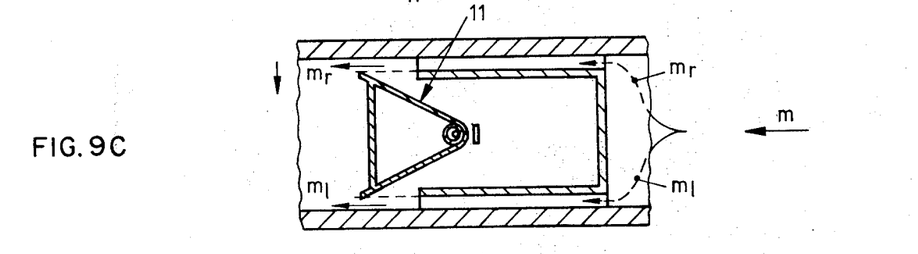
Figure 9D:
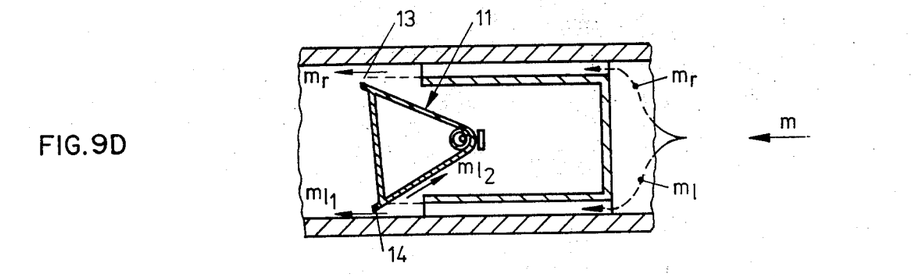

Since in position b the kinetic energy of the oscillatory element 11 is used up, it moves back in the opposite direction as a result of the flow forces, passes through the central position of FIG. 9C, and its detachment edge 14 enters the other flow path $m_1$ until it reaches its other extreme position, shown in FIG. 9D. The frequency with which the oscillatory element 11 moves between its two extreme positions is, as already shown, linearly dependent on the mass flow and can be detected inductively, photo-electrically or by means of for example a pressure pick-up arranged in the flow region 42.

Figure 10:
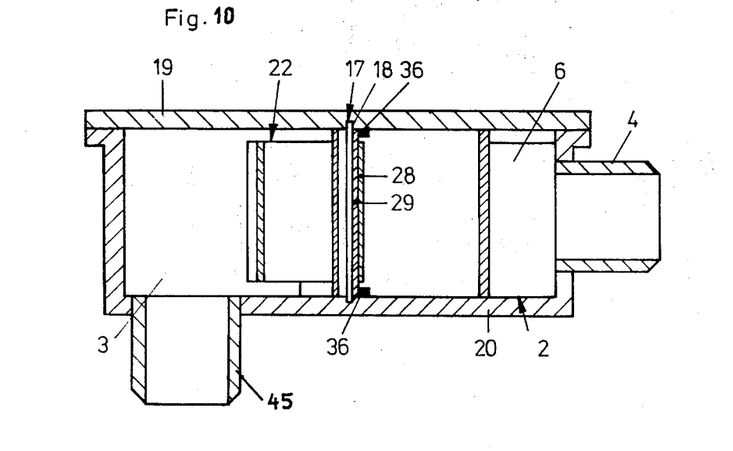
FIG. 10 shows a section similar to FIG. 5 with an angled outflow.

Whereas the oscillation starts itself in arrangements which follow the scheme shown in FIG. 1, in some constructional forms with two flow paths and again with specific types of fluid, it may be necessary to excite the oscillations. This exciting or stimulating of oscillations is effected in the simplest case by baffle surfaces, for example an end wall 43 at right angles to the direction of flow in FIG. 2 or by turbulence-producing means 44 which project into the flow paths. Finally, it is also possible to provide an outflow which is asymmetrical relatively to the oscillatory element or — as shown in FIG. 10 — an angled outflow. In the last-mentioned case the outlet union 45 is arranged at right angles to the inlet union 4. But otherwise the apparatus corresponds exactly to that shown in FIG. 5.

Figure 11:
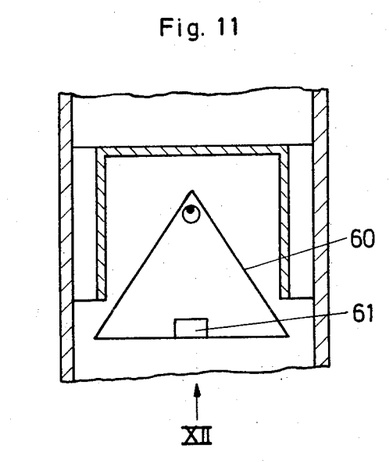
FIG. 11 shows a constructional form in diagrammatic manner for viscous or very slow-flowing fluids, in longitudinal section
Figure 12:
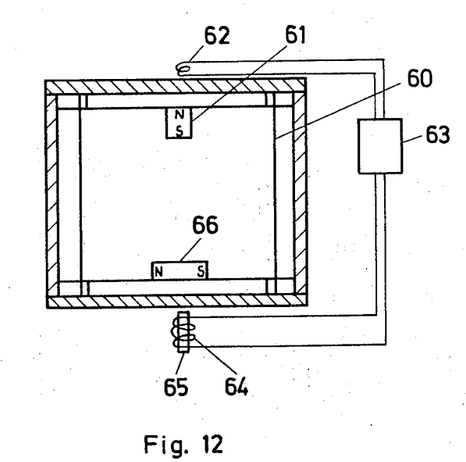
FIG. 12 shows the form of embodiment shown in FIG. 11 in a section taken in the direction of the arrow XII in FIG. 11.

For slow-flowing and/or viscous fluids, there is provided an external damping-inhibiting effect for the oscillatory element, which can be constructed as shown diagrammatically in FIGS. 11 and 12. The oscillatory element 60 comprises at its upper side a permanent magnet 61 acting as a signal source, whose signals are received by the measuring coil 62. The signal produced in the coil is proportional to the velocity and is fed by way of an amplifier 63 to a power coil 64 whose core 65 together with the magnet 66 arranged at the underside of the oscillatory element 60 provides the necessary external force for reducing damping in the measuring system.

I claim:

1. A method of measuring the flow rate of fluids comprising the steps of:

supporting an element for movement about an axis, flowing fluid in a path in a direction perpendicular to an offset from said axis directing said fluid onto a portion of said element downstream of said axis, normally biassing said element for movement transverse to the path of fluid flow so that said portion of said element in the fluid flow path is increased, and measuring the frequency of oscillation of said element.

2. The method of claim 1, wherein the fluid flow path is divided into at least two separate flow paths each of which flow paths is directed laterally past at least two separate portions of said element, said flow paths being united into a single flow path after passing said at least two separate portions.

3. A method as claimed in claim 1, further comprising the steps of applying an external force to said element and sensing the velocity of said element, said external force being proportional to said velocity whereby the flow rate of a slow moving or viscous fluid is measured.

4. A method as claimed in claim 3 wherein a travel dependent signal is taken from the element, said signal being applied to the element as said external force proportional to said signal.

5. A method as claimed in claim 3 wherein a velocity proportional signal is taken direct from the element, said signal being applied to the element as said external force proportional to said signal.

6. A method as claimed in claim 3, wherein an electric feedback is provided for obtaining said external force.

7. A method as claimed in claim 6, wherein said electric feedback includes a magnet connected to said element and an external magnetic field for influencing said magnet proportionally to the velocity of the fluid flow.

8. Apparatus for measuring the flow rate of fluids comprising:
   first means supporting an element for movement about an axis,
   second means for flowing fluid in a path in a direction perpendicular to and offset from said axis,
   said second means including means for directing said fluid into a portion of said element downstream of said axis,
   third means for normally biassing said element for movement transverse to the path of fluid flow so that said portion of said element in the fluid flow path is increased, and
   fourth means for measuring the frequency of oscillation of said element.

9. Apparatus as claimed in claim 8 wherein said second means includes a chamber in which said element is supported and said means for directing includes at least one duct, said duct being arranged to be horizontal and said element is supported above said duct and downstream thereof, said third means for normally biassing being gravitational force.

10. Apparatus as claimed in claim 8, further including means for effecting an external force on said element whereby the flow rate of a slow moving or viscous fluid can be measured, said external force being proportional to the momentary velocity of said element.

11. Apparatus as claimed in claim 10, wherein an electrical feedback converts a signal proportional to the velocity of said element into said external force.

12. Apparatus as claimed in claim 11 wherein a magnet is included on said element, said magnet being under the influence of an external magnetic field which varies proportionally to the velocity of the fluid flow.

13. Apparatus as claimed in claim 8, wherein said second means includes a collecting chamber through which the fluid can flow, a fluid inflow chamber to divide the fluid flow into at least two separate flow paths, conduits leading from said inflow chamber to said collecting chamber, each of said conduits having an outlet aperture in said collecting chamber for directing said fluid onto said portion of said element downstream of said axis, said element having at least two separate portions downstream of said axis.

14. Apparatus as claimed in claim 13 wherein said at least two separate portions are constructed symmetrically with respect to said at least two separate flow paths.

15. Apparatus as claimed in claim 14 wherein said at least two separate portions include free edges.

16. Apparatus as claimed in claim 15 wherein the said conduit outlets have internal boundary walls which face each other and the free edges are approximately aligned with said internal walls when the element is in a central position.

17. Apparatus as claimed in claim 15 wherein said element is prismatic in shape and is mounted in the region of one prism edge of the body, at least one of the other two prismatic edges of the body forming the free edges.

18. Apparatus as claimed in claim 13 wherein the element is mounted on means arranged upstream of said outlet apertures in relation to the direction of flow.

19. Apparatus as claimed in claim 18 wherein the element is rotatably mounted on a shaft arranged at right angles to the direction of fluid flow.

20. Apparatus as claimed in claim 13 wherein the element is cylindrical in shape and eccentrically mounted.

21. Apparatus as claimed in claim 13 wherein the element is of hollow construction whereby the apparatus can be used to measure the flow rate of gases.

22. Apparatus as claimed in claim 13 wherein the element is constructed substantially as a solid body whereby the apparatus can be used to measure the flow rate of viscous fluids.

23. Apparatus as claimed in claim 13 wherein the collecting chamber is provided with an outflow duct which is angled relative to the inflow direction of the fluid entering the collecting chamber whereby oscillations of the element are enhanced.

24. Apparatus as claimed in claim 13 wherein an outflow duct which is asymmetrical relative to said element is provided for enhancing oscillations.

25. Apparatus as claimed in claim 13 wherein baffle surfaces are provided downstream of the oscillatory element for enhancing oscillations of said elements.

26. Apparatus as claimed in claim 13 wherein turbulence producing means are provided downstream of the element, said turbulence producing means projecting into said two flow paths to stimulate oscillations of said elements.

27. Apparatus as claimed in claim 13 wherein the element is mounted so that it is spaced on all sides from the collecting chamber walls.

28. Apparatus as claimed in claim 13 wherein the inflow chamber and the collecting chamber are provided in a common housing having an inlet union and an outlet union.

29. Apparatus as claimed in claim 13 wherein a pressure pick-up is arranged in the region of the fluid flow in which said portion of the element enters.

* * * * *